(12) United States Patent
Sealy et al.

(10) Patent No.: US 9,964,229 B2
(45) Date of Patent: May 8, 2018

(54) BYPASS VALVE

(71) Applicant: Norgren Limited, Staffordshire (GB)

(72) Inventors: Mark Edward Byers Sealy, Warwickshire (GB); John Michael Morris, Auburn, WA (US); Christopher Edward Narborough, Derbyshire (GB); Patrick Williams, Birmingham (GB)

(73) Assignee: Norgren Limited, Lichfield, Staffordshire (GB)

( * ) Notice: Subject to any disclaimer, the term of this patent is extended or adjusted under 35 U.S.C. 154(b) by 263 days.

(21) Appl. No.: 14/435,033

(22) PCT Filed: Oct. 17, 2013

(86) PCT No.: PCT/GB2013/052713
§ 371 (c)(1),
(2) Date: Apr. 10, 2015

(87) PCT Pub. No.: WO2014/060760
PCT Pub. Date: Apr. 24, 2014

(65) Prior Publication Data
US 2015/0330530 A1 Nov. 19, 2015

Related U.S. Application Data

(60) Provisional application No. 61/714,964, filed on Oct. 17, 2012, provisional application No. 61/823,102, (Continued)

(51) Int. Cl.
*F25B 39/04* (2006.01)
*F16K 31/122* (2006.01)
(Continued)

(52) U.S. Cl.
CPC .......... *F16K 31/1221* (2013.01); *F01K 23/02* (2013.01); *F01K 23/065* (2013.01);
(Continued)

(58) Field of Classification Search
CPC .......... F25B 39/04; F25B 40/02; F25B 9/004; F25B 41/04; F25B 49/022; B64D 13/06
(Continued)

(56) References Cited

U.S. PATENT DOCUMENTS

2004/0255587 A1 12/2004 Radcliff et al.
2006/0266960 A1 11/2006 Lovell
(Continued)

FOREIGN PATENT DOCUMENTS

DE 29712083 U1 9/1997
DE 202005016372 U1 1/2006
(Continued)

*Primary Examiner* — Melvin Jones
(74) *Attorney, Agent, or Firm* — The Ollila Law Group LLC

(57) ABSTRACT

A bypass valve (130) that regulates a flow of a fluid in a waste heat recovery system (100) is provided. The bypass valve (130) comprises a valve housing (220), an expander poppet (250) coupled to the valve housing (220) and adapted to prevent the flow of the fluid to an expander (140), and a valve stem (230) with at least a portion disposed in the valve housing (220) wherein the valve stem (230) is adapted to displace the expander poppet (250) to allow the fluid to flow to the expander (140), and regulate the flow of the fluid.

14 Claims, 10 Drawing Sheets

Related U.S. Application Data filed on May 14, 2013, provisional application No. 61/828,260, filed on May 29, 2013, provisional application No. 61/844,973, filed on Jul. 11, 2013, provisional application No. 61/846,504, filed on Jul. 15, 2013.

(51) Int. Cl.
*F01K 23/06* (2006.01)
*F01K 23/10* (2006.01)
*F16K 11/16* (2006.01)
*F01K 23/02* (2006.01)

(52) U.S. Cl.
CPC ............ *F01K 23/10* (2013.01); *F16K 11/161* (2013.01); *Y10T 137/0318* (2015.04); *Y10T 137/0497* (2015.04); *Y10T 137/6416* (2015.04); *Y10T 137/7904* (2015.04); *Y10T 137/7922* (2015.04); *Y10T 137/7925* (2015.04)

(58) Field of Classification Search
USPC .................. 62/509, 401, 196.1, 118; 165/51
See application file for complete search history.

(56) References Cited

U.S. PATENT DOCUMENTS

| | | | |
|---|---|---|---|
| 2009/0071648 A1* | 3/2009 | Hagen | E21B 43/24 166/272.1 |
| 2010/0326076 A1* | 12/2010 | Ast | F01K 23/04 60/671 |
| 2011/0203278 A1 | 8/2011 | Kopecek et al. | |
| 2011/0209474 A1* | 9/2011 | Leibowitz | F01K 23/04 60/641.1 |
| 2012/0324891 A1* | 12/2012 | Raab | F01K 3/10 60/668 |

FOREIGN PATENT DOCUMENTS

| | | |
|---|---|---|
| EP | 2436888 A1 | 4/2012 |
| GB | 964194 A | 7/1964 |
| JP | 51-25834 | 3/1976 |
| JP | 58-149668 U | 10/1983 |
| JP | 61-38371 A | 2/1986 |
| JP | 2008-038916 A | 2/2008 |
| WO | 2012018004 A1 | 2/2012 |
| WO | 2012033010 A1 | 3/2012 |

\* cited by examiner

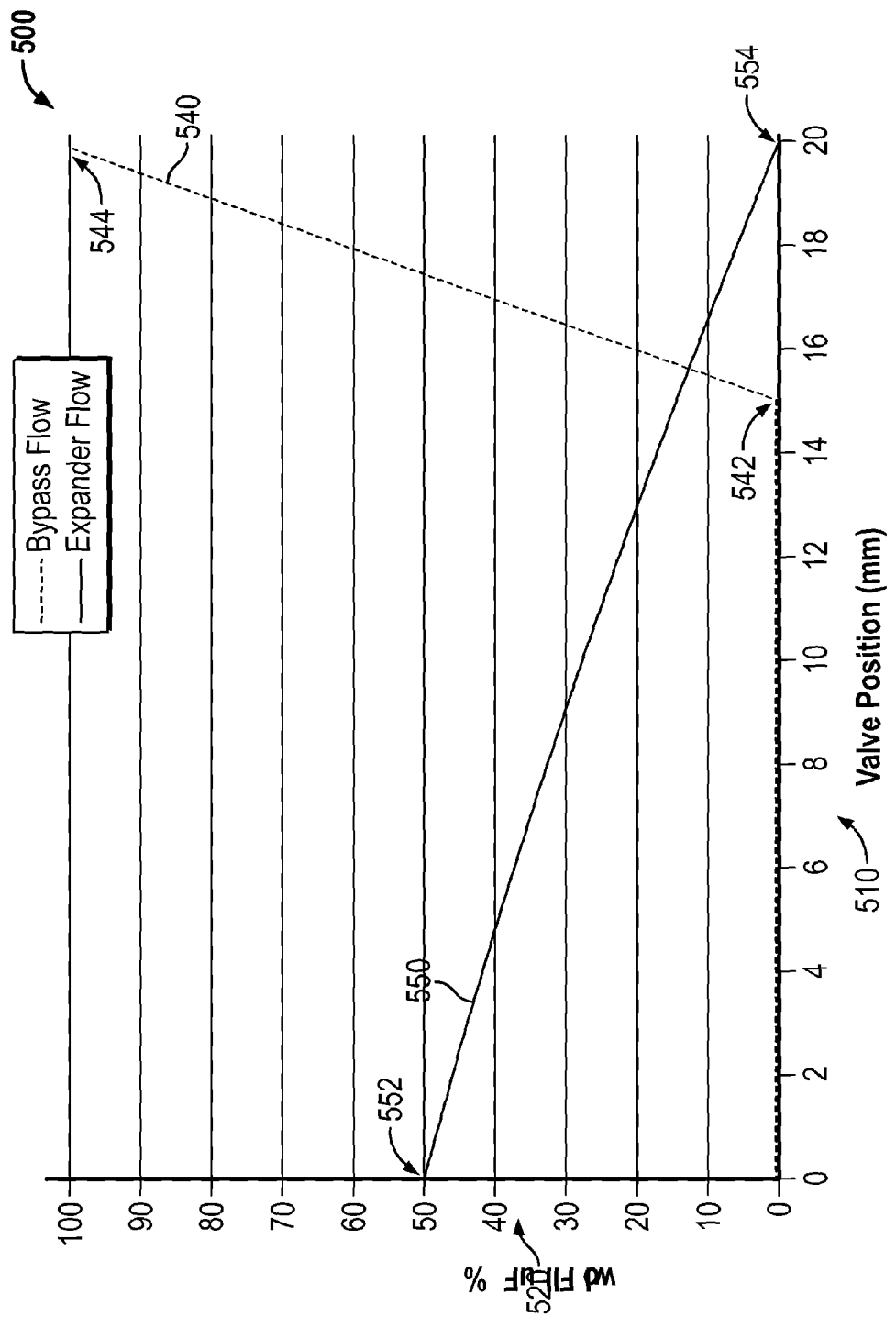

BYPASS VALVE

CROSS-REFERENCE TO RELATED APPLICATIONS

This is a National Stage entry of International Application No. PCT/GB13/52713, with an international filing date of Oct. 17, 2013 entitled "BYPASS VALVE", which claims priority of U.S. provisional patent application No. 61/714,964, filed Oct. 17, 2012 entitled "VEHICLE WASTE HEAT RECOVERY SYSTEM", U.S. provisional patent application No. 61/823,102 filed on May. 14, 2013 entitled "BYPASS VALVE", U.S. provisional patent application No. 61/828,260 filed on May 29, 2013 entitled "VEHICLE WASTE HEAT RECOVERY SYSTEM", U.S. provisional patent application No. 61/844,973 filed on Jul. 11, 2013 entitled "STATIC SEAL FLUID CONTROL MODULE FOR WASTE HEAT RECOVERY SYSTEMS" and U.S. provisional patent application No. 61/846,504 filed on Jul. 15, 2013 entitled "BYPASS VALVE".

TECHNICAL FIELD

The embodiments described below relate to components in fluid systems, and more particularly, to bypass valves.

BACKGROUND

Internal combustion (IC) engines are used throughout the world and mainly for motor vehicles. IC engines account for one of the largest consumers of petroleum products known. Due to the large amount of petroleum products consumed by IC engines and the gases exhausted from IC engines, numerous regulatory agencies have implemented regulations or are in the process of implementing regulations that require minimum average fuel economy of vehicles as well as limit the amount of pollutants that are exhausted from vehicles.

Earlier attempts at reducing vehicle emissions have centered on exhaust gas treatments. For example, earlier attempts have introduced reagents into the exhaust gas stream prior to the gas passing through a catalyst in order to effect selective catalytic reduction (SCR) of the nitrogen oxides ($NO_x$) in the exhaust gases. Additionally, many vehicles now include exhaust gas recirculation (EGR) systems to recirculate at least some of the exhaust gases. Although EGR reduces the harmful emissions of vehicles, it also often reduces the vehicle's fuel economy.

The uses of SCR and EGR have been effective in reducing the emission problems in the exhaust stream, but have done little in improving the fuel economy and fuel consumption of vehicles. With the tighter regulations that are being implemented, many manufacturers have turned their focus to increasing the fuel economy of IC engines. It is generally known that only about thirty to forty percent of the energy produced by the fuel combustion of IC engines translates to mechanical power. Much of the remaining energy is lost in the form of heat. Therefore, one particular area of focus in the motor vehicle industry has been to recover some of the heat that is generated by the IC engine using a Rankine cycle.

While these prior art attempts have improved the vehicle's efficiency, they lack adequate control of the working fluid and the working fluid's temperature. For example, U.S. Pat. No. 4,031,705 discloses a heat recovery system that heats the working fluid using heat from the IC engine's exhaust and the IC engine's cooling circuit, i.e., the IC engine's radiator. A problem with the '705 patent is that the bypass circuit directs vapor directly into a condenser. Although this is typically not a problem for lower temperature and/or pressure vapors, as the temperature and/or pressure increases, the shock to the condenser caused by receiving superheated vapor can reduce the life expectancy of the condenser. Similarly, the vapor may also reduce the life of the '705 expander (i.e., vapor engine). For example, if the fluid entering the expander has too much liquid content, the expander may be damaged by the liquid entering a high speed expander due to, for example, wear caused by the liquid. The expander may also be damaged if the vapor fluid flow rate or temperature is too high.

Accordingly, there is a need for a bypass valve in waste heat recovery systems. There is also a need for the bypass valve to regulate a flow of a heated fluid in a waste heat recovery system.

SUMMARY

According to an embodiment, a bypass valve that regulates a flow of a fluid in a waste heat recovery system comprises a valve housing, an expander poppet coupled to the valve housing and adapted to prevent the flow of the fluid to an expander, and a valve stem with at least a portion disposed in the valve housing wherein the valve stem is adapted to displace the expander poppet to allow the fluid to flow to the expander and regulate the flow of the fluid.

According to an embodiment, forming a bypass valve that regulates a flow of a fluid in a waste heat recovery system comprises forming a valve housing, forming an expander poppet and coupling the expander poppet to the valve housing to prevent the flow of the fluid to an expander, and forming and positioning a valve stem with at least a portion disposed in the valve housing and adapting the valve stem to displace the expander poppet to allow the fluid to flow to the expander and regulate the flow of the fluid.

According to an embodiment, a method of regulating a flow of a fluid in a waste heat recovery system comprises preventing the flow of the fluid to an expander with an expander poppet, and moving a valve stem in the valve housing to and from the expander poppet to regulate the flow of the fluid.

ASPECTS

According to an aspect, a bypass valve (130) that regulates a flow of a fluid in a waste heat recovery system (100) comprises a valve housing (220); an expander poppet (250) coupled to the valve housing (220) and adapted to prevent the flow of the fluid to an expander (140); and a valve stem (230) with at least a portion disposed in the valve housing (220) wherein the valve stem (230) is adapted to displace the expander poppet (250) to allow the fluid to flow to the expander (140), and regulate the flow of the fluid.

Preferably, the valve stem (230) is further adapted to prevent the flow of the fluid to a bypass outlet (224).

Preferably, the valve stem (230) is further adapted to move to and from the expander poppet (250) to regulate the flow of the fluid.

Preferably, the bypass valve (130) wherein the valve housing (220) further comprises a bypass outlet (224) and the valve stem (230) is further adapted to allow the fluid to flow to the bypass outlet (224) and the expander (140) simultaneously.

Preferably, the valve stem (230) further comprises a meter profile (232) that changes a flow control orifice (244) when the valve stem (230) moves in the valve housing (220) to regulate the flow of the fluid.

Preferably, the flow control orifice (244) comprises a space between valve stem (230) and the valve housing (220).

Preferably, the valve housing (220) further comprises a bypass outlet (224) and a valve seat (242) that interfaces with the valve stem (230) to form a fluid seal that prevents the flow of the fluid to the bypass outlet (224).

Preferably, the bypass valve (130) further comprises a stem spring (234) and a stem spring retainer (236) adapted to press the valve stem (230) to a bypass flow position.

Preferably, the bypass valve (130) further comprises an actuation piston (238) that is adapted to move the valve stem (230) towards the expander poppet (250).

Preferably, the bypass valve (130) wherein the actuation piston (238) is adapted to press the valve stem (230) towards the poppet (250).

Preferably, the bypass valve (130) further comprises a poppet spring (254) that is adapted to press the expander poppet (250) into the valve housing (220) to form a fluid seal that prevents the flow of the fluid to the expander (140).

Preferably, the valve stem (230) further adapted to regulate the flow of the fluid to a bypass outlet (224) while preventing fluid flow to the expander (140).

Preferably, the bypass valve (130) further comprising an actuator housing (210) that is coupled to the valve housing (220) with a thermal isolation gasket (218).

Preferably, the bypass valve (130) further comprising a bushing (240) adapted to guide the valve stem (230) in a substantially linear direction.

According to an aspect, forming a bypass valve (130) that regulates a flow of a fluid in a waste heat recovery system (100) comprises forming a valve housing (220), forming an expander poppet (250) and coupling the expander poppet (250) to the valve housing (220) to prevent the flow of the fluid to an expander (140), and forming and positioning a valve stem (230) with at least a portion disposed in the valve housing (220) and adapting the valve stem (230) to displace the expander poppet (250) to allow the fluid to flow to the expander (140), and regulate the flow of the fluid.

Preferably, the forming the valve stem (230) further comprises adapting the valve stem (230) to prevent the flow of the fluid to a bypass outlet (224).

Preferably, the forming the valve stem (230) further comprising adapting the valve stem (230) to move in a direction to and from the expander poppet (250) to regulate the flow of the fluid.

Preferably, the forming the bypass valve (130) wherein the forming the valve housing (220) further comprises forming a bypass outlet (224) and further adapting the valve stem (250) to allow the fluid to flow to the bypass outlet (224) and the expander (140) simultaneously.

Preferably, the forming the valve stem (230) further comprises forming a meter profile (232) and forming a flow control orifice (244) and adapting the meter profile to change a flow control orifice (244) by moving the valve stem (230) in the valve housing (220) to regulate the flow of the fluid.

Preferably, the flow control orifice (244) comprises forming a space between valve stem (230) and the valve housing (220).

Preferably, the forming the valve housing (220) further comprises a bypass outlet (224) and a valve seat (242) that interfaces with the valve stem (230) to guide the valve stem (230) in a substantially linear direction.

Preferably, the forming the bypass valve (130) further comprises forming and adapting a stem spring (234) and a stem spring retainer (236) to press the valve stem (230) to a bypass flow position.

Preferably, the forming the bypass valve (130) further comprises forming and adapting an actuation piston (238) to move the valve stem (230) towards the expander poppet (250).

Preferably, the forming the bypass valve (130) wherein the forming and adapting the actuation piston (238) further comprises forming and adapting the actuation piston (238) to press the valve stem (230) towards the poppet (250).

Preferably, the forming the bypass valve (130) further comprises forming and adapting a poppet spring (254) to press the expander poppet (250) into the valve housing (220) to form a fluid seal that prevents the flow of the fluid to the expander (140).

Preferably, the forming the valve stem (230) further comprises adapting the bypass valve (230) to regulate the flow of the fluid to a bypass outlet (224) while preventing fluid flow to the expander (140).

Preferably, the forming the bypass valve (130) further comprises forming and coupling an actuator housing (210) to the valve housing (220) with a thermal isolation gasket (218).

Preferably, the forming the bypass valve (130) further comprises forming a bushing (240) to guide the valve stem (230) in a substantially linear direction.

According to an aspect, a method of regulating a flow of a fluid in a waste heat recovery system (100) comprises preventing the flow of the fluid to an expander (140) with an expander poppet (250), and moving a valve stem (230) in the valve housing (220) to and from the expander poppet (250) to regulate the flow of the fluid.

Preferably, the method further comprising flowing the fluid past a meter profile (232) on the valve stem (230) to regulate the flow of the fluid.

Preferably, the method further comprising displacing the expander poppet (250) with the valve stem (230).

According to an aspect, a waste heat recovery system (100) for an engine, comprises:
  a fluid supply (104);
  one or more evaporators (120) in fluid communication with the fluid supply (104) and receiving waste heat from the engine (101);
  an expander (140) in fluid communication with the one or more evaporators;
  a condenser (150); and
  a bypass valve (130) comprising a moveable valve member (230) adapted to provide a fluid communication path between the one or more evaporators and the condenser,
    a moveable pilot piston adapted to move the moveable valve member (230), and
    a static seal (217;720) between the fluid communication path and the moveable pilot piston.

Preferably, the static seal comprises a membrane.

Preferably, the static seal comprises a flexible bellows (217;722).

Preferably, the bypass valve comprises:
a piston rod attached to the pilot piston and adapted to engage the valve member;
an actuator housing (210) comprising a cylinder for the pilot piston;
wherein a first part of the flexible bellows (217) is sealed to the piston rod and a second part of the flexible bellows is sealed to the actuator housing.

Preferably, the flexible bellows is tubular with an internal and an external surface.

Preferably, the external surface is in fluid communication with the fluid communication path.

Preferably, the external surface is in fluid communication with the fluid communication path downstream of the valve member.

Preferably, the fluid communication path downstream of the valve member comprises a convergent-divergent section and wherein the external surface is in fluid communication with the fluid communication path downstream of the convergent-divergent section.

Preferably, the bypass valve comprises a valve housing, the valve housing and valve member together defining the fluid communication path, wherein the valve housing and actuator housing are sealingly engaged at a first location and the second part of the flexible bellows is sealed to the actuator housing at a second location, offset along the axis of movement of the valve stem from the first location.

According to an aspect, a bypass valve (130) for regulating a flow of a fluid in a waste heat recovery system (100) comprises:
- a valve housing (220);
- an expander poppet (250) coupled to the valve housing (220) and adapted to prevent the flow of the fluid to an expander (140); and
- a valve stem (230) with at least a portion disposed in the valve housing (220)
- an actuation piston (238) that is adapted to move the valve stem (230) towards the expander poppet (250) to allow the fluid to flow to the expander (140) and regulate the flow of the fluid;
- a static seal between the valve stem and the moveable pilot piston.

Preferably, the static seal comprises a membrane.

Preferably, the static seal comprises a flexible bellows (217;722).

Preferably, the bypass valve comprises:
a piston rod attached to the actuation piston and adapted to engage the valve stem;
an actuator housing (210) comprising a cylinder for the actuation piston;
wherein a first part of the flexible bellows (217) is sealed to the piston rod and a
second part of the flexible bellows is sealed to the actuator housing.

Preferably, the flexible bellows is tubular with an internal and an external surface.

Preferably, the external surface is in fluid communication with that portion of the valve housing accommodating the valve stem.

Preferably, the external surface is in fluid communication with that portion of the valve housing downstream of the valve stem.

Preferably, that portion of the valve housing downstream of the valve member comprises a convergent-divergent section and wherein the external surface is in fluid communication with that portion of the valve housing downstream of the convergent-divergent section.

Preferably, the valve housing and actuator housing are sealingly engaged at a first location and the second part of the flexible bellows is sealed to the actuator housing at a second location, offset along the axis of movement of the valve stem from the first location.

BRIEF DESCRIPTION OF THE DRAWINGS

FIG. 5 shows a graph 500 depicting an exemplary flow through the bypass valve 130 according to an embodiment.

DETAILED DESCRIPTION

Figure 1:
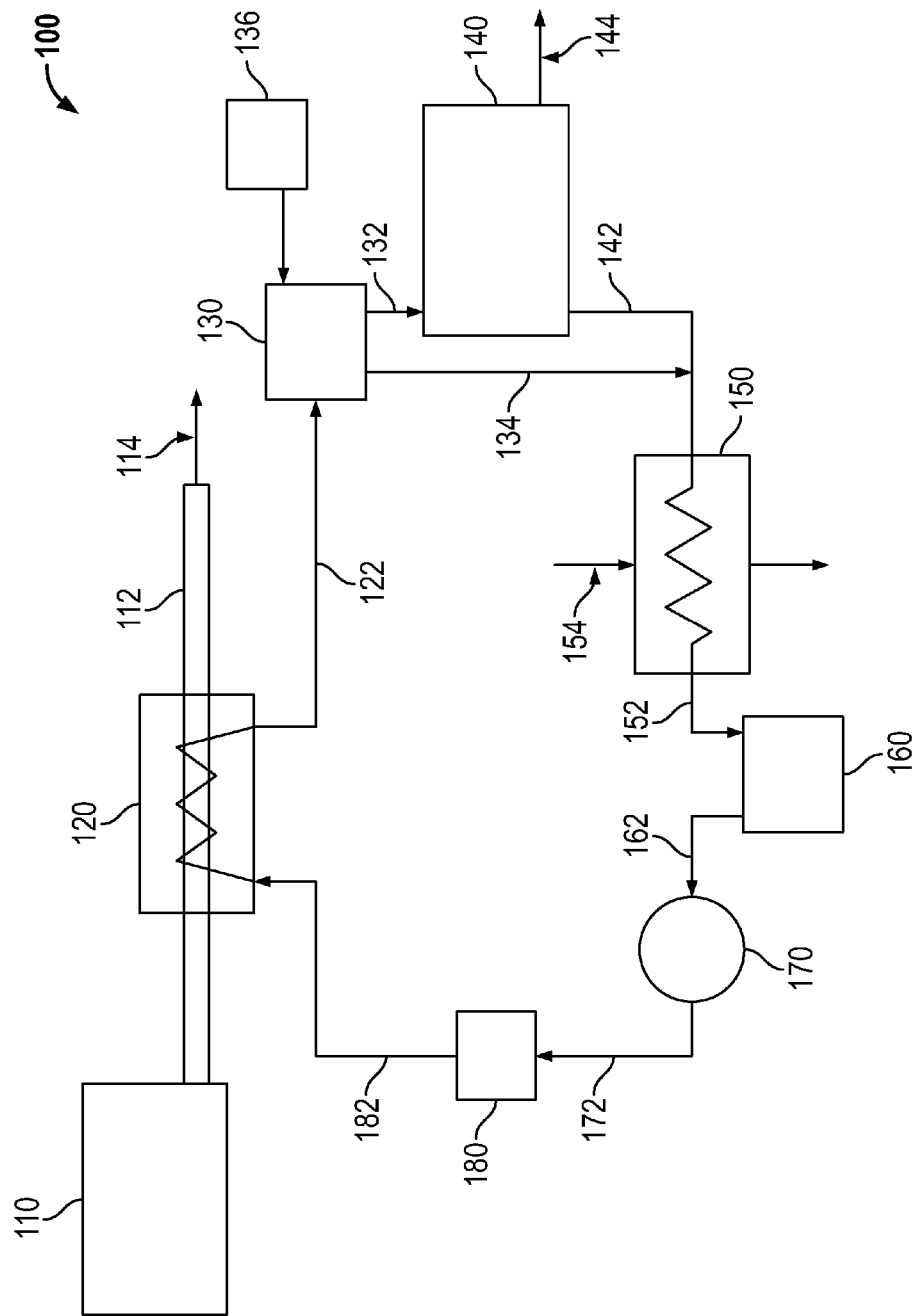
FIG. 1 shows a schematic of a waste heat recovery system 100 for an engine 110 according to an embodiment.
Figure 8:
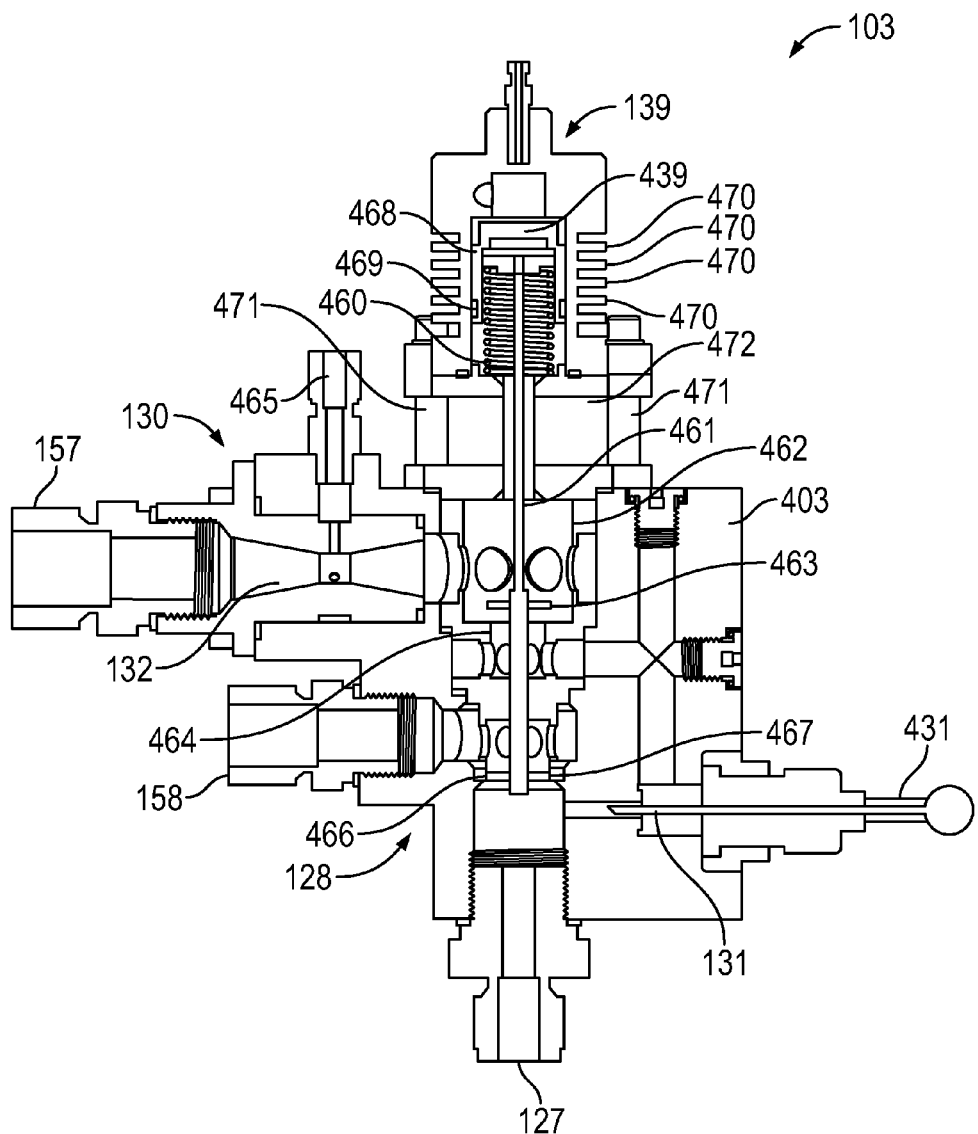
FIG. 8 shows a cross-sectional view of a vapor control module according to an embodiment.

FIGS. 1 8 and the following description depict specific examples to teach those skilled in the art how to make and use the best mode of embodiments of a waste heat recovery system. For the purpose of teaching inventive principles, some conventional aspects have been simplified or omitted. Those skilled in the art will appreciate variations from these examples that fall within the scope of the present description.

Those skilled in the art will appreciate that the features described below can be combined in various ways to form multiple variations of the waste heat recovery system. As a result, the embodiments described below are not limited to the specific examples described below, but only by the claims and their equivalents.

Waste Heat Recovery System

FIG. 1 shows a schematic of a waste heat recovery system 100 for an engine 110 according to an embodiment. The waste heat recovery system 100 may be implemented for an engine 110 mounted on a motor vehicle (not shown) to drive that vehicle, for example. Therefore, the engine 101 may comprise an IC engine, in particular a reciprocating piston engine. The vehicle may be an on-road truck, the operation of which is set out in the standard 'highway cycle' or World Harmonised Test Cycle (WHTC). Such a truck engine may particularly be powered by diesel or natural gas. According to an embodiment, the waste heat recovery system 100 may employ a fluid, such as water, an organofluorine such as Freon®, or a hydrocarbon such as ethanol, or the like as a working fluid. The fluid may change into different states such as liquid and gas as it recovers and converts waste heat from the engine 110 into work. For example, a Rankine cycle may be employed to convert heat into work. The particular fluid used may vary from one application to another.

The waste heat recovery system 100 may include at least one evaporator 120, a bypass valve 130, and an expander 140 to recover and convert heat from the engine 110 into work. The waste heat recovery system 100 may also include a condenser 150 and a reservoir 160 to cool the fluid for reuse in the waste heat recovery system 100. The waste heat recovery system 100 may also include a fluid pump 170 and a flow control module 180 to provide and control the flow of the fluid to the evaporator 120 and through the waste heat recovery system 100 as will be described in the following prior to discussing the bypass valve 130 in more detail.

The engine 110 may be coupled to an exhaust pipe 112 which carries a vehicle exhaust 114. The vehicle exhaust 114 may have waste heat generated by the engine 110. The engine 110 may be any source of waste heat such as a turbine, electrical motor, etc. As depicted, the engine 110 may be an IC engine. As depicted, an exhaust pipe 112 carries the vehicle exhaust 114 which may have the waste heat. Although the evaporator 120 is depicted as recovering the waste heat from the vehicle exhaust 114 flowing through the exhaust pipe 112, any suitable source of waste heat generated by the engine 110 may be recovered by the waste heat recovery system 100. For example, heat may be recovered from the engine 110's exhaust gas recirculation system (EGR).

According to an embodiment, the evaporator 120 may use the waste heat from the engine 110 to convert the fluid to a superheated vapor although the fluid may be converted into any suitable form. The evaporator 120 may be any device suitable to convert the fluid. The evaporator 120 is in fluid communication with the bypass valve 130 via a fluid line 122. The evaporator outlet 122 fluid may be a superheated vapor entering the bypass valve 130 at approximately 400° C. (752° F.) and 40 bar (580 psi) although any suitable temperature and pressure may be employed. The foregoing temperatures and pressures are exemplary embodiments and do not limit the scope of this and other embodiments.

As depicted in FIG. 1, the bypass valve 130 may provide a fluid flow from the evaporator 120 to the condenser 150 and/or the expander 140. The expander inlet 132 fluid enters the expander 140 which converts heat energy in the fluid into work 144. The bypass condenser outlet 134 fluid flows to the condenser 150 without going through the expander 140. Heat energy in the fluid flowing to the condenser 150 may not be converted into work 144 by the expander 140. The bypass valve 130 is described in more detail with reference to FIGS. 2a-4b.

Still referring to FIG. 1, the expander inlet 132 fluid flows into the expander 140 where it may reduce in enthalpy while expanding. Therefore, the expander 140 can convert at least some of the energy of the fluid to the work 144. The work 144 may be in the form of a mechanical motion. The expander 140 may comprise a variety of devices, such as a turbine, a piston, a vapor engine, such as a rotary vane type vapor engine, etc. In the depicted embodiment the expander 140 may comprise the vapor engine.

The expander 140 can be mechanically coupled to the crankshaft or other suitable component of the engine 110 in order to add power to the engine 110. When the expander 140 is not generating work 144, the engine 110 may or may not be mechanically decoupled from the expander 140.

Still with reference to FIG. 1, the fluid may flow from the expander 140 via the expander outlet 142 and combine with the bypass condenser outlet 134 fluid before flowing into the condenser 150. Although the bypass condenser outlet 134 and the expander outlet 142 fluids are depicted as combining before entering the condenser 150, the bypass condenser outlet 134 and the expander outlet 142 fluids may flow into the condenser 150 separately. For example, the bypass condenser outlet 134 may be coupled to the condenser 150 via a different port than the expander outlet 142.

The condenser 150 may cool the bypass condenser outlet 134 and/or the expander outlet 142 fluids to a temperature suitable for the reservoir 160, the fluid pump 170 and/or the flow control module 180. For example, the condenser 150 may cool the bypass condenser outlet 134 and/or the expander outlet 142 fluids to room temperature. As depicted, the condenser 150 employs a coolant 154 to cool the bypass condenser outlet 134 and/or the expander outlet 142 fluids. Heat may be transferred out of the condenser 150 to the coolant 154 to cool the fluid. The cooled fluid may flow from the condenser 150 to the reservoir 160 via the condenser outlet 152.

The fluid pump 170 may draw the fluid out of the reservoir 160. The fluid pump 170 can elevate the pressure of the fluid from the reservoir 160 to a higher threshold pressure. In some embodiments, the fluid pump 170 may raise the pressure of the fluid to a threshold pressure of approximately 40 bar (580 psi) above the reservoir pressure, which may be at atmospheric pressure. However, other threshold pressures are certainly possible and the particular example pressure should in no way limit the scope of this and other embodiments. The fluid pump 170 may be driven by any suitable means. The fluid pump 170 may be driven by the engine 110 or may be driven by a separate electric motor. The fluid pump 170 may provide the pressurized fluid to the evaporator 120 via the flow control outlet 182.

With a basic description of the overall waste heat recovery system 100 discussed in the foregoing, attention is now directed to the bypass valve 130.

Bypass Valve

Figure 2A:
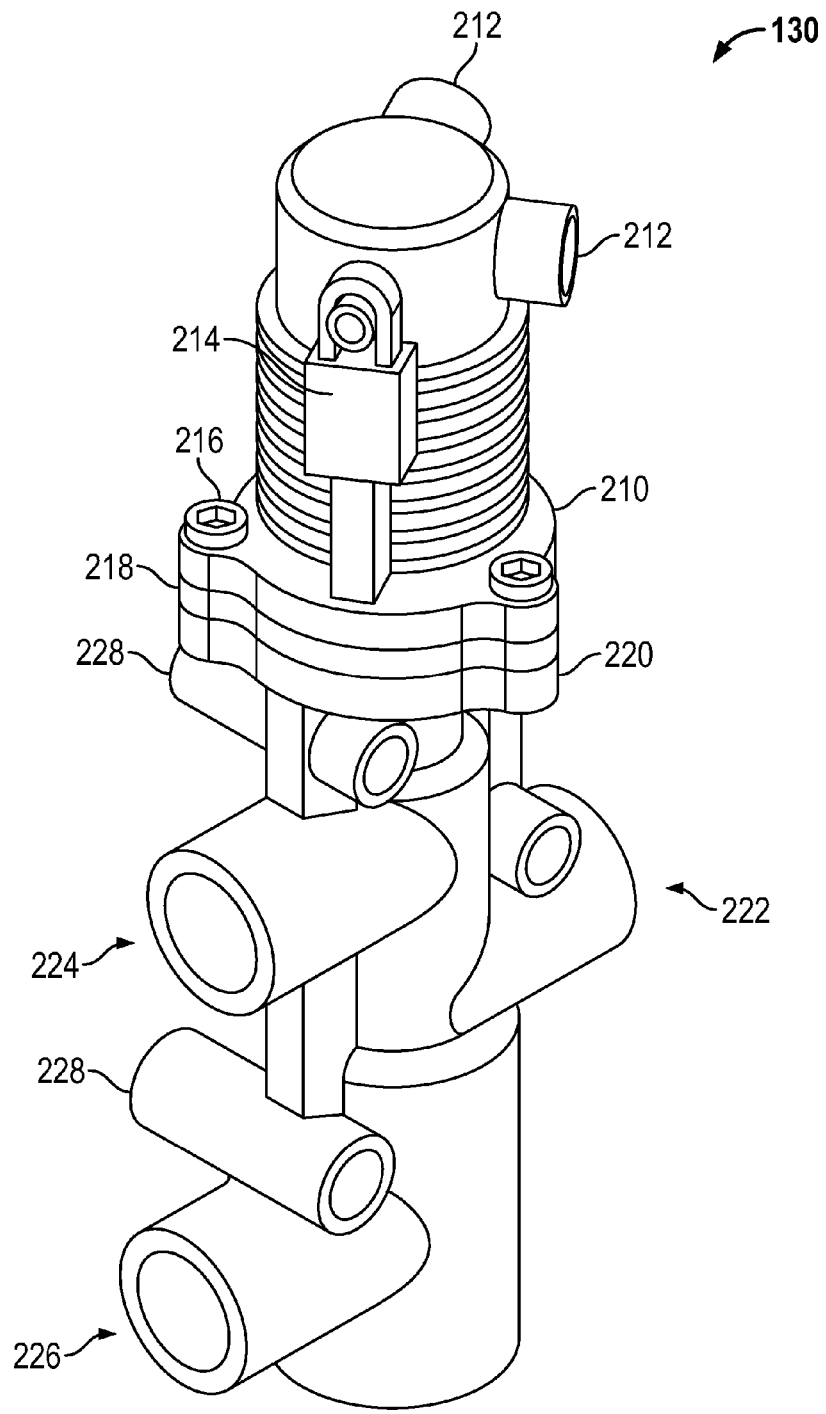
FIG. 2a shows a perspective view of the bypass valve 130 according to an embodiment.

FIG. 2a shows a perspective view of the bypass valve 130 provided according to an embodiment. The bypass valve 130 may bypass, regulate, and/or direct flow of the fluid to the expander 140. The bypass valve 130 may also regulate the fluid flows to the condenser 150. As depicted, the bypass valve 130 may include an actuator housing 210 coupled to a valve housing 220 via a thermal isolation gasket 218. The actuator housing 210 may have one or more actuator ports 212 although two actuator ports 212 are depicted. The actuator housing 210 may also have a position sensor 214 coupled to the side of the actuator housing 210. The valve housing 220 may have a valve inlet 222, a bypass outlet 224, and an expander outlet 226. The bypass valve 130 may be coupled to something else, such as the engine 110, via the one or more bolt holes 228.

Figure 2B:
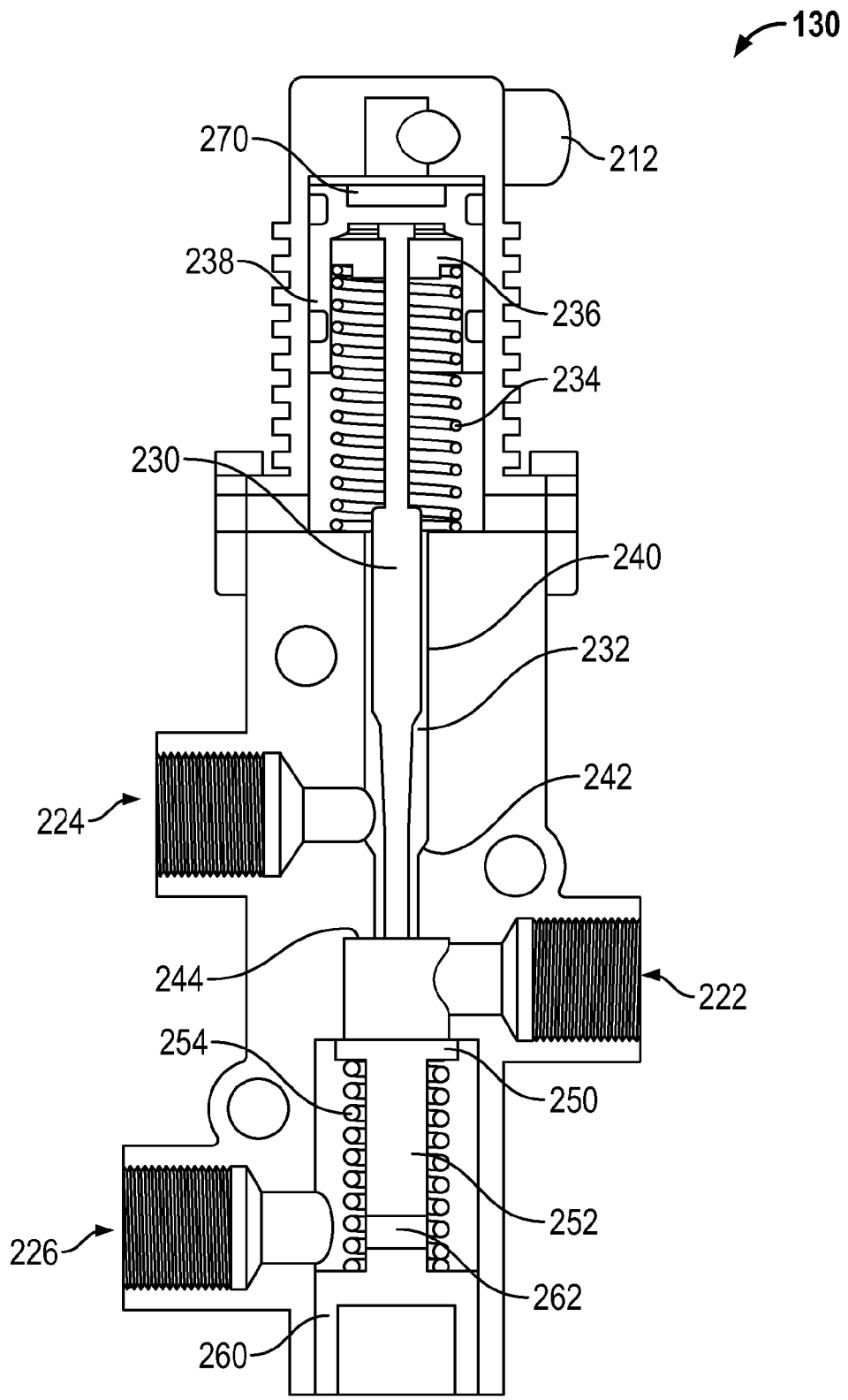
FIG. 2b shows a cross-section view of the bypass valve 130 according to an embodiment.

FIG. 2b shows a cross-section view of the bypass valve 130 provided according to an embodiment. In addition to the items described with reference to FIG. 2a, the bypass valve 130 includes a valve stem 230. The valve stem 230 includes a meter profile 232. The valve stem 230 may be coupled to a stem spring retainer 236. The stem spring 234 and stem spring retainer 236 are depicted as disposed in an actuation piston 238. The bypass valve 130 also includes a position sensor flag 270. The position sensor flag 270 may be comprised of a magnetic material that may be sensed by the position sensor 214. The valve stem 230 is slidably coupled to a bushing 240. The bushing 240 may be coupled to an inner surface of the valve housing 220. The bypass valve 130 also includes a valve seat 242 and a flow control orifice 244 on the valve housing 220. The bypass valve 130 may also include an expander poppet 250. The expander poppet 250 may be slidably coupled to a poppet retainer 260. In particular, a poppet shaft 252 may linearly move in a guide 262. The expander poppet 250 may also be coupled to the poppet retainer 260 via the expander poppet spring 254.

The actuator housing 210 and the valve housing 220 are depicted as coupled together to form an outer housing of the bypass valve 130. However, the outer housing may be comprised of more or fewer parts in alternative embodiments. For example, in alternative embodiments, the valve housing 220 may be in two pieces where the two parts are mated between the valve inlet 222 and the expander outlet 226. The actuator housing 210 and the valve housing 220 may be made of stainless steel (e.g., 316 stainless steel) for corrosion and heat resistance properties although any suitable material may be employed. For example, in alternative embodiments, a ceramic material may be employed for high temperature waste heat recovery systems.

The one or more actuator port 212 may be a fluid port that is fluidly coupled with a valve controller 136 described with reference to FIG. 1. Although the one or more actuator port 212 are depicted as a fluid port that is fluidly coupled with the valve controller 136 any suitable means of coupling the bypass valve 130 to the valve controller 136 may be employed. For example, the valve controller 136 may be a stepper driver/controller instead of a controller. Accordingly, the one or more actuator ports 212 may be electrical ports that receive stepper motor drive currents to move the valve stem 230. As shown, the valve controller 136 may be a proportional valve that regulates the flow of the fluid from the waste heat recovery system 100 to the bypass valve to move the piston 238 and/or valve stem 230. That is, the fluid in the waste heat recovery system 100 may actuate the bypass valve 130.

The position sensor 214 may be a magnetic position sensor although any sensor may be employed. For example, in some embodiments, an optical position sensor may be employed although this may require that the actuator housing 210 include a transparent view port such as a quartz window. The position sensor 214 may sense the position of the valve stem 230 by sensing the position of the position flag 270.

The valve inlet 222 may be in fluid communication with the evaporator 120. The bypass outlet 224 may be in fluid communication with the condenser 150. The expander outlet 226 may be in fluid communication with the expander 140. The valve inlet 222, the bypass outlet 224, and the expander outlet 226 are threaded fitting ports although any suitable means of fluidly coupling the bypass valve 130 with the expander 140 and the condenser 150 may be employed.

The valve stem 230 may be adapted to displace the expander poppet 250. The valve stem 230 may also be adapted to regulate a bypass fluid flow. The bushing 240 may be adapted to guide the valve stem 230 in a substantially linear direction. The bushing 240 may be removable. That is, the bushing 240 may be replaced by separating the actuator housing 210 from the valve housing 220. The expander poppet 250 may be adapted to prevent the flow of the fluid to the expander 140. For example, the expander poppet 250 may be adapted to prevent the flow of the fluid to the expander 140 when pressed against a portion of the valve housing 220. The valve stem 230, the bushing 240, and the expander poppet 250 may be comprised of stainless steel although any suitable material may be employed. For example, the valve stem 230 may be comprised of a material with corrosion and wear resistance properties such as 420 stainless steel with a polished surface or other suitable wear resistant material or coating.

The stem spring 234 and the stem spring retainer 236 may be adapted to press the valve stem 230 to a bypass flow position that is described in more detail below with reference to FIGS. 3a-3b. The stem spring 234 and the stem spring retainer 236 may be comprised of any suitable material such as stainless steel. Since, as will be explained in the following, the stem spring 234 and the stem spring retainer 236 may be isolated (e.g., thermally) from the fluid. Accordingly, the stem spring 234 and the stem spring retainer 236 may be selected for their mechanical properties. The actuation piston 238 may be adapted to press the valve stem 230 towards the expander poppet 250. In the embodiment shown, the actuation piston 238 surrounds the stem spring 234 and the stem spring retainer 236. The operation of the actuation piston 238 is described in more detail with reference to FIGS. 3a and 3b.

As will be described in the following, the bypass valve 130 may regulate the flow of fluid from the evaporator 120 by moving the valve stem 230. The bypass valve 130 may also regulate the flow of the fluid to the expander 140 and the condenser 150.

States

Figure 3A:
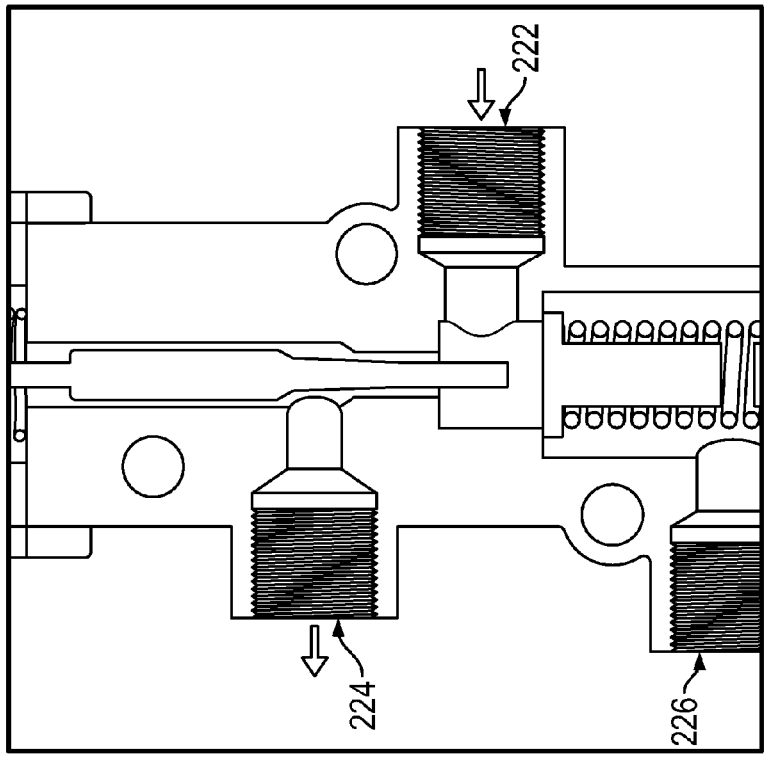
FIG. 3a shows the bypass valve 130 in a bypass flow state according to an embodiment.

FIG. 3a shows the bypass valve 130 in a bypass flow state according to an embodiment, the reference numbers below referring to the corresponding features shown in FIGS. 2a and 2b. As depicted in FIG. 3a, the valve stem 230 is positioned to maximize a bypass fluid flow. In an embodiment, the maximized bypass fluid flow maximizes the flow to the condenser 150 via the bypass outlet 224. The valve stem 230 is depicted as fully withdrawn from the expander poppet 250. The flow control orifice 244 may be maximized. The expander poppet 250 is depicted as pressed into the actuator housing 210 by the expander poppet spring 254 to create a seal that may prevent the fluid from flowing through the expander outlet 226 towards the expander 140. In the bypass flow state depicted in FIG. 3a, the evaporator outlet 122 fluid may enter the valve inlet 222 and flow through the flow control orifice 244 past the meter profile 232.

The bypass flow state may correspond to a maximum bypass flow rate. That is, the valve stem 230 is maximally displaced towards the actuator housing 210. The valve seat 242 may be configured such that when the valve stem 230 is in the depicted position, obstruction of the flow from the valve inlet 222 to the bypass outlet 224 is minimized. However, in alternative embodiments a different flow control orifice 244 may be used where the maximal flow through the bypass outlet 224 is at different valve stem 230 positions. For example, it may be desirable to have a maximal bypass flow when the valve stem 230 is positioned to switch the bypass valve 130 out flow from the valve inlet 222 to the bypass outlet 224. As discussed in the foregoing, the valve stem 230 may move in the bypass valve 130 to regulate the flow of the fluid in the bypass valve 130, which is described in the following.

Figure 3B:
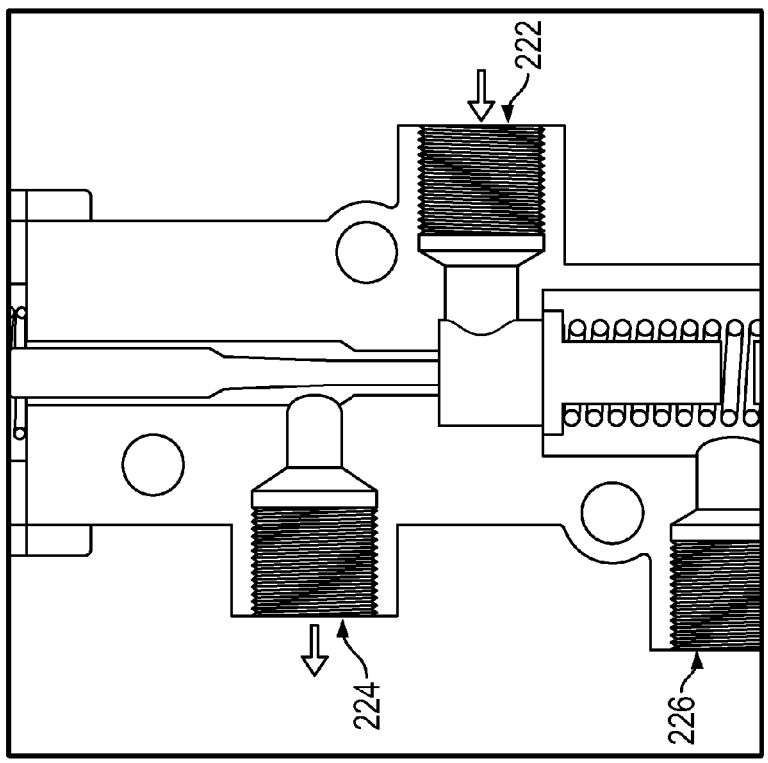
FIG. 3b shows the bypass valve 130 in a regulated bypass flow state according to an embodiment.

FIG. 3b shows the bypass valve 130 in a regulated bypass flow state according to an embodiment, the reference numbers below referring to the corresponding features shown in FIGS. 2a and 2b. As can be seen when comparing FIG. 3a with 3b, the valve stem 230 is closer to the expander poppet 250. In this position, the flow control orifice 244 may be smaller than the flow control orifice 244 depicted in FIG. 3a. In an embodiment, the valve stem 230 may be moved by the valve controller 136 which provides a pressurized fluid to the actuator housing 210. The pressurized fluid presses against the actuation piston 238 to compress the stem spring 234. By compressing the stem spring 234, the valve stem 230 is moved towards the expander poppet 250.

In the depicted position, the fluid flowing through the bypass outlet 224 may be regulated by the flow control orifice 244. As with FIG. 3a, the expander poppet 250 is depicted in FIG. 3b pressed against the valve housing 220 by the expander poppet spring 254. The fluid may not flow through the expander outlet 226 towards the expander 140. The fluid flowing through the bypass outlet 224 may be regulated by moving the valve stem 230 about the position depicted in FIG. 3b. For example, the valve stem 230 may continue moving towards the expander poppet 250 to decrease the size of the flow control orifice 244 until the valve stem 230 seats on the expander poppet 250 as will be described in the following.

Figure 4B:
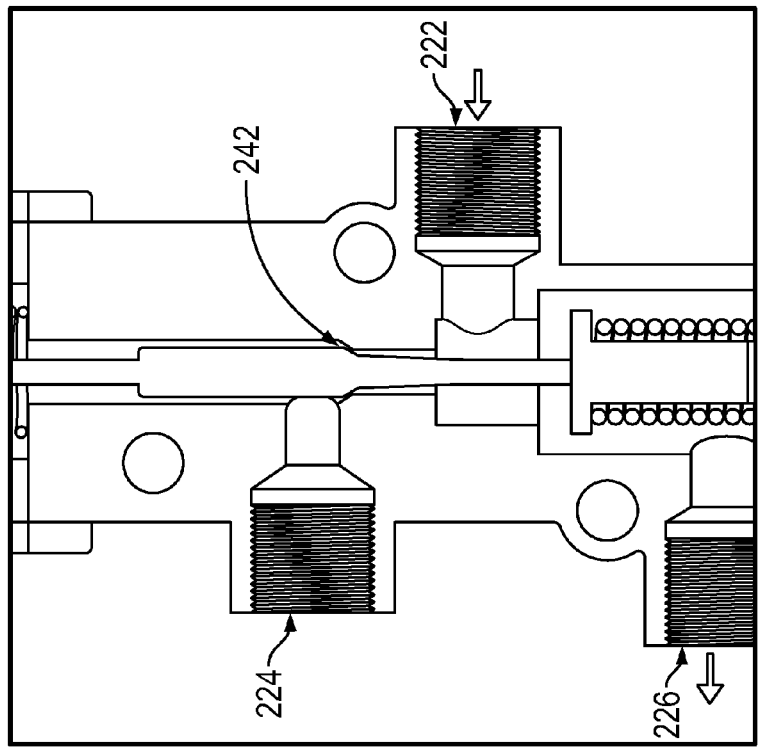
FIG. 4b shows the bypass valve 130 in an expander flow state according to an embodiment.
Figure 4A:
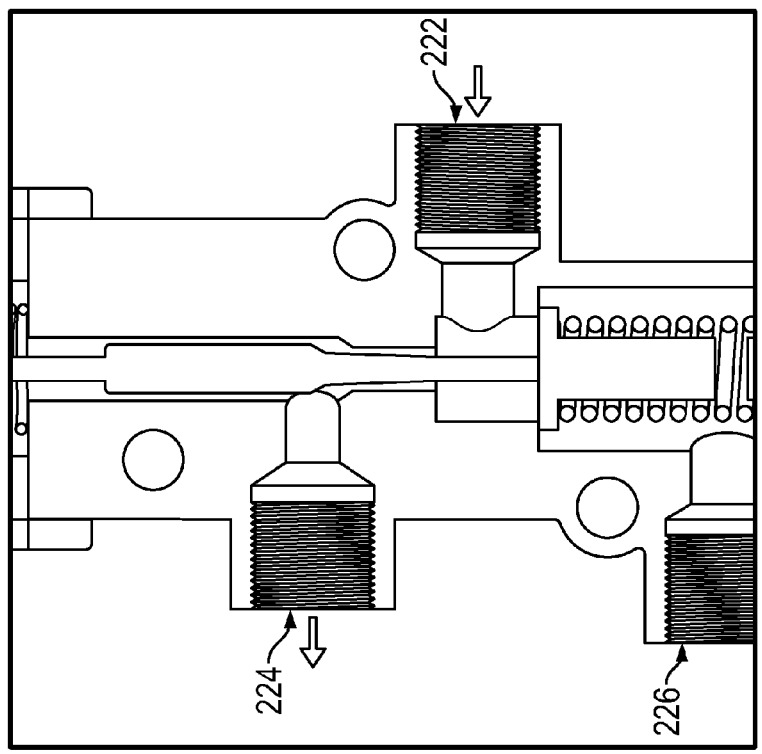
FIG. 4a shows the bypass valve 130 in a seated regulated bypass flow state according to an embodiment.

FIG. 4a shows the bypass valve 130 in a seated regulated bypass flow state according to an embodiment, the reference numbers below referring to the corresponding features shown in FIGS. 2a and 2b. The valve stem 230 is depicted as seated on the expander poppet 250. The expander poppet 250 is still pressed against the valve housing 220 by the expander poppet spring 254. The flow control orifice 244 may be smaller than depicted in FIGS. 3a and 3b. The seated regulated bypass flow state may therefore be a minimal bypass flow rate state. That is, the fluid flow rate from the evaporator 120 to the condenser 150 via the bypass outlet 224 may be at a minimum where there is also no fluid flowing to the expander 140. However, as discussed in the foregoing with reference to FIG. 3a, the valve seat 242 may be different in alternative embodiments and, therefore, the seated regulated bypass flow state may not be a minimal bypass flow rate state.

FIG. 4b shows the bypass valve 130 in an expander flow state according to an embodiment, the reference numbers below referring to the corresponding features shown in FIGS. 2a and 2b. As depicted, the valve stem 230 is pressed into the valve housing 220 which may provide a fluid seal. The fluid seal may prevent the fluid from flowing from the valve inlet 222 towards the bypass outlet 224. Accordingly, fluid may not flow through the bypass outlet 224 towards the condenser 150. The expander poppet 250 is depicted as pressed by the valve stem 230 towards the poppet retainer 260. The guide 262 in the poppet retainer 260 may limit the lateral or rotational movement of the expander poppet 250 as it is pressed by the valve stem 230. The expander poppet spring 254 may press the expander poppet 250 towards the valve stem 230 which may cause the valve stem 230 to remain in contact with the expander poppet 250 as the valve stem 230 moves the expander poppet 250.

Operation

In operation, the bypass valve 130 may cycle between the states depicted in FIGS. 3a-4b. For example, the bypass valve 130 may regulate the fluid flow from the evaporator 120 to the condenser 150 without fluid flow to the expander 140 by moving the valve stem 230 between the positions depicted in FIG. 3a and FIG. 4a. The flow control orifice 244 may change size thereby reducing or increasing the flow and/or pressure of the fluid to the condenser 150 via the bypass condenser outlet 134.

In another example, flow through the bypass condenser outlet 134 may be regulated while fluid is flowing towards the expander 140. In this example, the valve stem 230 may be in a position that is between the position depicted in FIGS. 4a and 4b. The regulation of the flow through the bypass outlet 224 towards the condenser 150 may also regulate the flow towards the expander 140. That is, reducing the flow through the bypass outlet 224 may increase the flow through the expander outlet 226 towards the expander 140.

The distance the valve stem 230 moves may be selected to provide the foregoing described states. For example, the distance from the bypass state depicted in FIG. 3a and the expander flow state depicted in FIG. 4b may be selected along with the distance that the valve stem 230 travels before it touches the expander poppet 250. In the depicted embodiment, the distance the valve stem 230 moves between the bypass flow state and the expander flow state may be 25 mm. The distance that the valve stem 230 can displace the expander poppet 250 may be 5 mm. Accordingly, the valve stem 230 may move within a 20 mm range to regulate the flow of the fluid to the bypass outlet 224 without flow to the expander 140. While the valve stem 230 may be moved within the 5 mm displacement of the poppet 250 to regulate the flow of the fluid to the condenser 150 and the expander 140. When the valve stem 230 has displaced the expander poppet 250 the 5 mm towards the poppet retainer 260, the valve stem 230 may form a seal with the valve seat 242 as shown in FIG. 4b. Other lengths may be selected.

In the embodiment depicted in FIGS. 3a-4b, the bypass valve 130 may allow the fluid to flow through the bypass valve 130. The fluid may flow to the condenser 150 through the bypass outlet 224 and/or to the expander 140 through the expander outlet 226. In other words, the valve stem 230 may never prevent the fluid from flowing through the bypass outlet 224 and the expander outlet 226. The valve stem 230 may always allow the fluid to flow from the evaporator 120 which may prevent pressure buildup in the evaporator 120 as the fluid converts from a fluid to a gas. Also, the fluid may flow even though the bypass valve 130 may experience a failure. For example, the valve controller 136 may unexpectedly fail and, therefore, is unable to move the valve stem 230. Even in such a situation, the fluid may still flow through the bypass valve 130 thereby preventing a pressure buildup in the evaporator 120. In effect, the bypass valve 130 may be considered fail safe.

With the operation of the bypass valve 130 described in the foregoing, attention is now directed to the bypass valve 130's use in the waste heat recovery system 100.

Use in a Waste Heat Recovery System

According to an embodiment, the waste heat recovery system 100 can be used in the waste heat recovery system 100 that, for example, is part of motor vehicles that include IC engines. The waste heat recovery system 100 can be controlled by the motor vehicle's electronics and therefore the waste heat recovery system 100 may not include its own separate electronics. However, in other embodiments, a waste heat recovery system may employ its own controls. These control systems may control the position of the valve stem 230 in the bypass valve 130. For example, the motor vehicle's control system may communicate (e.g., electronically) with the valve controller 136 to move the valve stem 230 between the positions depicted in FIGS. 3a-4b to, for example, provide more work 144 to the engine 100.

The bypass valve 130 may remain in the bypass flow state depicted in FIG. 3a when the work 144 is not desired or when the temperature of the fluid in the evaporator 120 has not reached the threshold temperature. The work 144 may not be desired when the vehicle is braking or stopped. In some embodiments, a brake signal may automatically de-actuate the valve controller 136 thereby allowing the stem spring 234 to press the valve stem 230 to the bypass flow state or the regulated bypass flow state.

According to an embodiment, if the work 144 is desired, the valve stem 230 may be moved to press the expander poppet 250 towards the poppet retainer 260 to allow heated fluid (e.g., superheated vapor) to flow to the expander 140. The position of the valve stem 230 may be controlled by the valve controller 136 as described in the foregoing. The expander 140 may convert the fluid's heat energy into the work 144. The amount of work 144 that is produced may be controlled by the position of the valve stem 230. For example, if more work 144 is desired the valve stem 250 may fully depress the expander poppet 250 to prevent heated fluid from flowing through the bypass outlet 224. Therefore, the bypass valve 130 may direct fluid flow to the expander 140 to convert waste heat from the engine 110 into work 144. The work 144 may be employed by the vehicle or any other suitable system, apparatus, etc.

Exemplary flow rates that are determined by the bypass valve 130 states while used in the waste heat recovery system 100 is described in more detail in the following.

Fluid Flow Rates

FIG. 5 shows a graph 500 depicting exemplary flows through the bypass valve 130 according to an embodiment. The graph 500 includes a valve position 510 and a percentage of full flow 520 axes. The valve position 510 is depicted in mm units although any suitable measurement system may be employed. Also, the position ranges from 0 to 25 mm which corresponds to the valve stem 230 positions described with respect to FIGS. 3a-4b. The percentage of full flow refers to the percentage of flow possible through the bypass valve 130 which may correspond to the expander flow state depicted in FIG. 4b.

The graph 500 also includes an expander flow rate line 540 and a bypass flow rate line 550. The expander flow rate line 540 includes a poppet open transition 542 and a 100% expander flow 544 regions. The poppet open transition 542 may correspond to the seated regulated bypass flow state depicted in FIG. 4a. The 100% expander flow 544 region may correspond to the expander flow state depicted in FIG. 4b. The bypass flow rate line 550 includes a 50% flow rate 552 and a 0% flow rate 554 regions. The 50% flow rate 552 region corresponds to when the valve stem 230 is in the position depicted in FIG. 3a.

The expander flow rate line 540 corresponds with fluid flow through the expander outlet 226. The bypass flow rate line 550 corresponds with fluid flow through the bypass outlet 224. As can be observed from the graph 500, the fluid flow through the bypass valve 130 is through bypass outlet 224 and/or the expander outlet 226. The expander flow rate line 540 and the bypass flow rate line 550 shows that the expander outlet 226 flow rate increases relatively faster than the bypass outlet 224 flow rate. For example, the expander flow rate line 540 is flat until the poppet open transition 542 occurs. The bypass flow rate line 550 decreases from about the 50% flow rate 552 to about 0% flow rate 554. This is also the same position on the valve position 510 axis where the expander flow rate line 540 reaches 100% fluid flow. Accordingly, there may always be fluid flow through the bypass valve 130 which may be intrinsically or fail safe. The fluid flow through the bypass valve 130 is also regulated as can be observed by the linear fluid flow rates. Although linear fluid flow rates are depicted in the graph 500, other fluid flow rates may be employed. For example, it may be desirable to have curvilinear fluid flow rates.

Although the foregoing describes the position of the valve stem 230 being determined for a given amount of work 144, the position of the valve stem 230 may be determined on the basis of a variety of other parameters. For example, the valve stem 230 position may also be controlled to regulate the temperature and pressure of the evaporator outlet 122 fluid. While the valve stem 230 is being positioned to regulate the temperature and pressure of the fluid in the evaporator 120, the heated fluid may not be flowing to the expander 140.

Accordingly, the fluid in the evaporator 120 may reach a temperature and pressure that utilizes the expander 140 at a desired efficiency. For example, in a waste heat recovery system 100 that employs a Rankine cycle, the efficiency of the expander 140 may depend on the temperature and pressure of the fluid that enters the expander 140. The position of the valve stem 230 may also be controlled to utilize the condenser 150 in a desired manner (e.g., to extend the life of the condenser 150, maintain a desired fluid temperature in the condenser 150, etc.) Accordingly, in these and other embodiments, the bypass valve 130 may regulate a flow of the heated fluid in a waste heat recovery system.

Figure 6A:
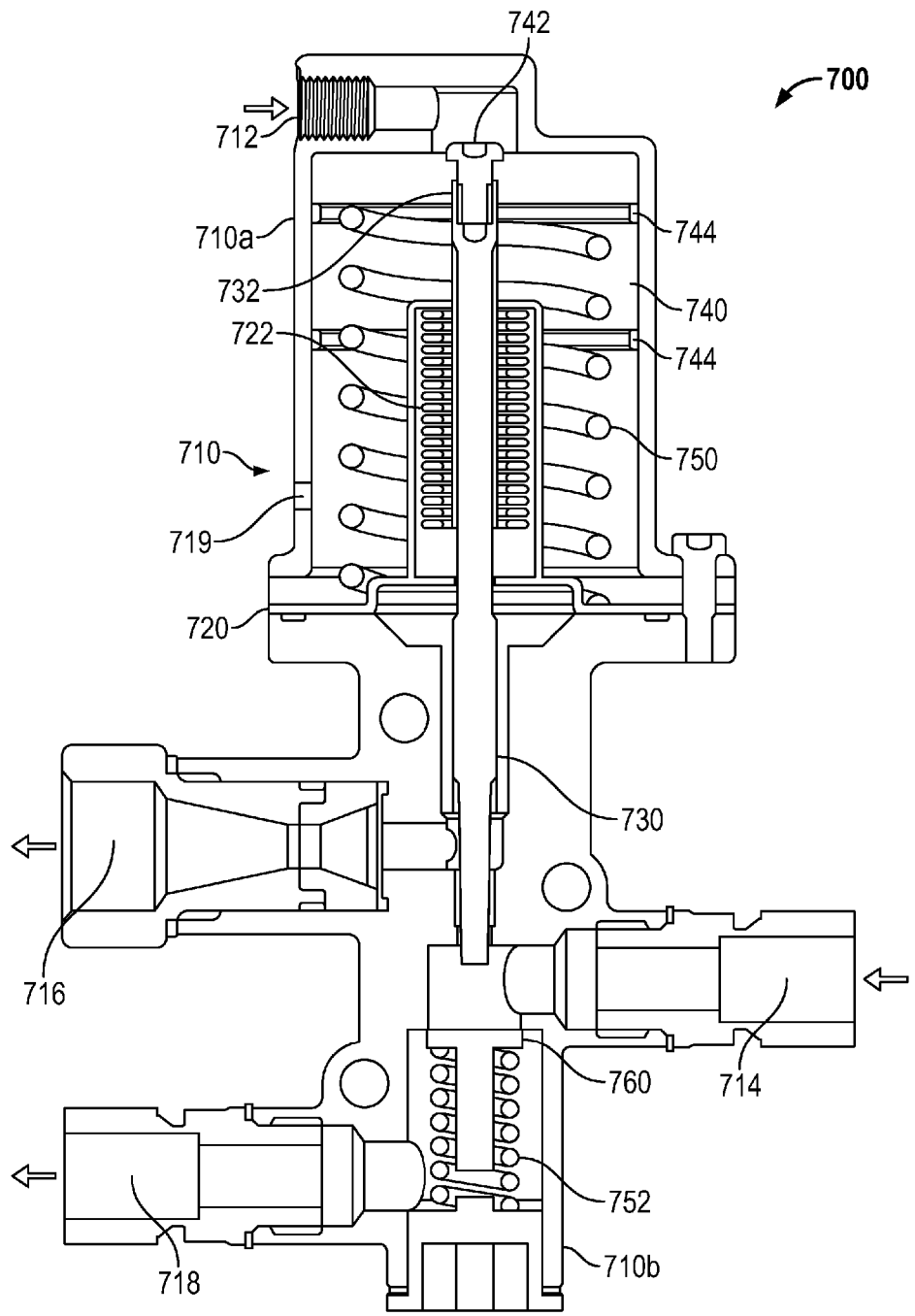
FIGS. 6A and 6B show a second embodiment of bypass valve in non-actuated and actuated states respectively.
Figure 6B:
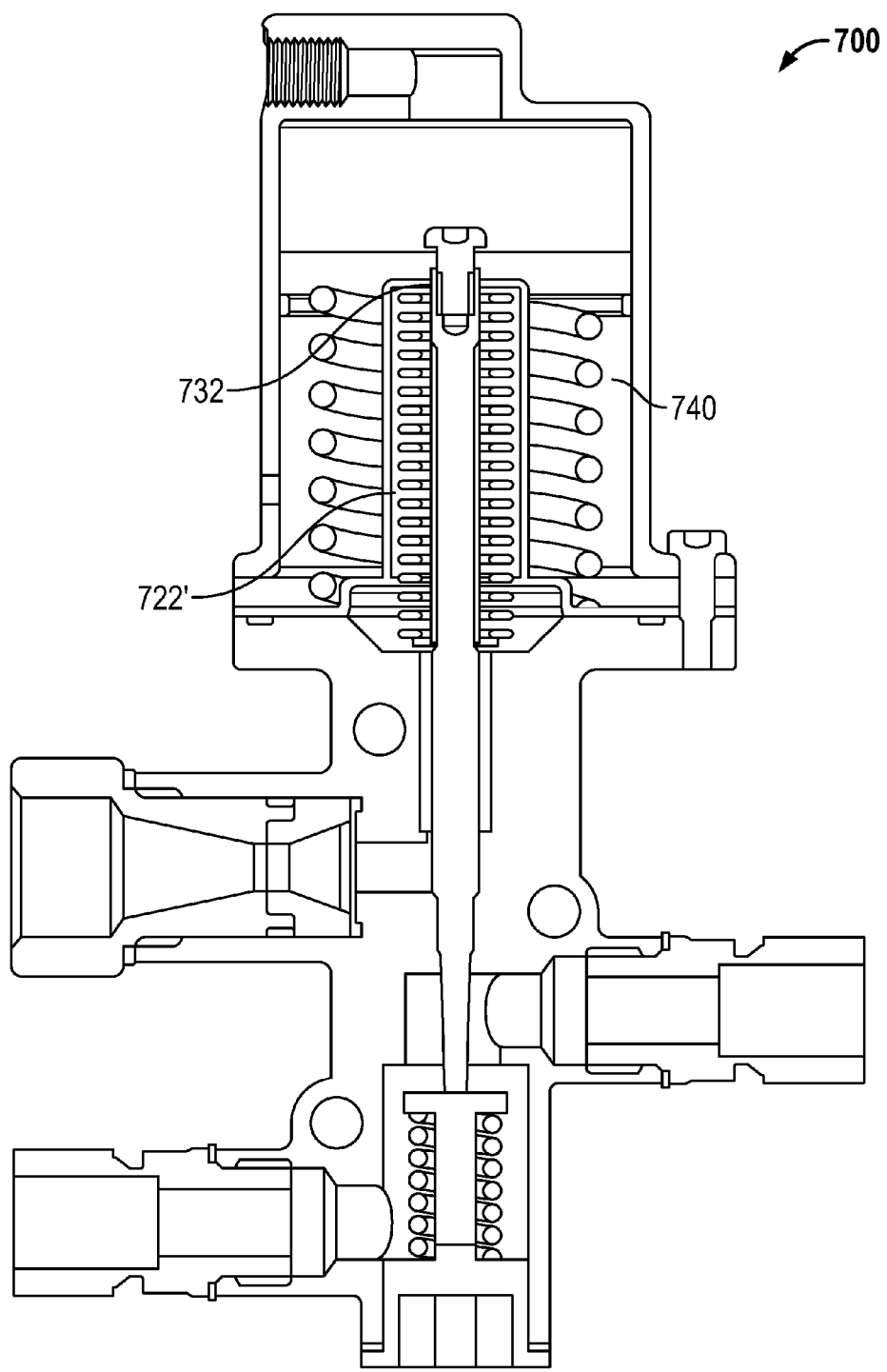

FIGS. 6A and 6B show a bypass valve 700 according to another embodiment. The bypass valve 700 may include a valve housing 710 with an actuator port 712, an inlet 714, a bypass outlet 716, and an expander outlet 718. The valve housing 710 may also include a two way breather 719 to allow fluid to flow to and from valve housing 710. The bypass valve 700 may include an actuator seal 720 that separates an actuator portion 710a from the regulating portion 710b of the valve housing 710. The fluid in the actuator portion 710a of the valve housing 710 may be pressurized fluid to actuate the bypass valve 700. For example, the fluid in the actuator portion 710a may be pressurized air. The valve housing 710 may also include a two way breather 719. The fluid in the regulating portion 710b of the valve housing 710 may be the working fluid that is regulated by a stem 730. The stem 730 may be slidably coupled to the valve housing 710 and coupled to the actuator seal 720 at the stem seal 732. The bypass valve 700 may also include a piston 740 that is coupled to the stem 730 and a return spring 750. The return spring 750 may provide a biasing force to oppose the pressurized fluid in the actuator portion 710a of the valve housing 710. The bypass valve 700 may also comprise a poppet 760 that is slidably coupled to the valve housing 710.

The valve housing 710 may be fluidly coupled to the evaporator(s) 120 and to the expander 140 and the condenser 150. For example, the inlet 714 may be fluidly coupled to the evaporator(s) 120. Additionally, the bypass outlet 716 may be fluidly coupled to the condenser 150 and the expander outlet 718 may be fluidly coupled to the expander 140. The expander 140 and the condenser 150 may therefore be in selective and proportional fluid communication with the evaporator(s) 120 via the bypass valve 700. The valve housing 710 may also enclose pressurized fluid in the actuator portion 710a to actuate the bypass valve 700 to regulate fluid flow to the expander 140 and the condenser 150. The pressurized fluid in the actuator portion 710a of the valve housing 710 and the working fluid in the regulating portion 710b of the valve housing 710 may be separated by the actuator seal 720.

The actuator seal 720 may be a static fluid seal that separates fluid in the actuator portion 710a from the fluid in the regulating portion 710b of the valve housing 710. The actuator seal 720 may include a membrane, which may comprise a bellows 722 that allows the stem 730 to move to regulate the fluid in the bypass valve 700. That is, even though the bellows of the actuator seal 720 is coupled to the stem 730 to form a static seal at the stem seal 732, the stem 730 may still move linearly in the valve housing 710 to regulate the flow of the fluid. The movement of the stem 730 may be seen in the difference between the figures shown in FIGS. 6A and 6B. The movement stretches the bellows 722. During this movement, fluid under the piston 740 may pass through the two way breather 719 to prevent buildup of undesirable fluid pressure under the piston 740.

The stem 730 may be a proportional flow stem that regulates the flow of the fluid to the expander 140 and/or the condenser 150. For example, the stem 730 may include a profile that is adapted to change the size of an opening between the stem 730 and the valve housing 710 to regulate the flow of the fluid by moving the stem 730 in the bypass valve 700. The piston 740 may be coupled to the stem 730 with a screw 742 although any suitable means of coupling may be employed. The piston 740 may include seals 744 that allow the pressurized fluid to press the piston 740 towards the poppet 760. The stem 730 may be returned to position shown in FIG. 6A by the return spring 750. The stem 730 may also be adapted to displace the poppet 760.

The poppet 760 may prevent the flow of the working fluid to the expander 140 to ensure that the working fluid does not have conditions that are unsuitable when the working fluid is supplied to the expander 150. For example, the poppet 760 may be closed if the working fluid is not fully vaporized (e.g., has liquid droplets.) The poppet 760 may be opened by the stem 730 when the working fluid is fully vaporized and at a desirable temperature. The poppet 760 may be pressed against the valve housing 710 or the stem 730 by the poppet spring 752.

The bypass valve 700 may regulate the flow of the working fluid in the waste heat recovery system 100 without an atmospheric dynamic seal. As shown in FIGS. 6A and 6B, the actuator seal 720 separates the working fluid in the regulating portion 710b from the actuator portion 710a. Accordingly, the stem 730 may be moved by means other than the working fluid, such as pressurized air, without an atmospheric dynamic seal. For example, pressurized air may enter the inlet 712 and press against the piston 740 to move the stem 730 towards the poppet 760. This may reduce the flow of the fluid to the condenser 150. The return spring 750 may press against the pressurized fluid. Accordingly, the pressure in the pressurized fluid may be varied by, for example, a controller (not shown) that moves the stem 730 in the bypass valve 700. In alternative embodiments, the actuator portion 710a may include, for example, an electric actuator utilizing a linear drive motor instead of the piston 740. For example, instead of using pneumatic actuation, the stem 730 may be moved by a linear drive motor. An alternative embodiment may employ a hydraulic actuation mechanism, which may employ as the hydraulic fluid the working fluid of the waste heat recovery cycle or a different fluid from a separate hydraulic circuit to the waste heat recovery cycle. Accordingly, the bypass valve 700 may regulate the flow of the working fluid in the waste heat recovery system 100 with no dynamic seals to atmosphere.

Figure 7:
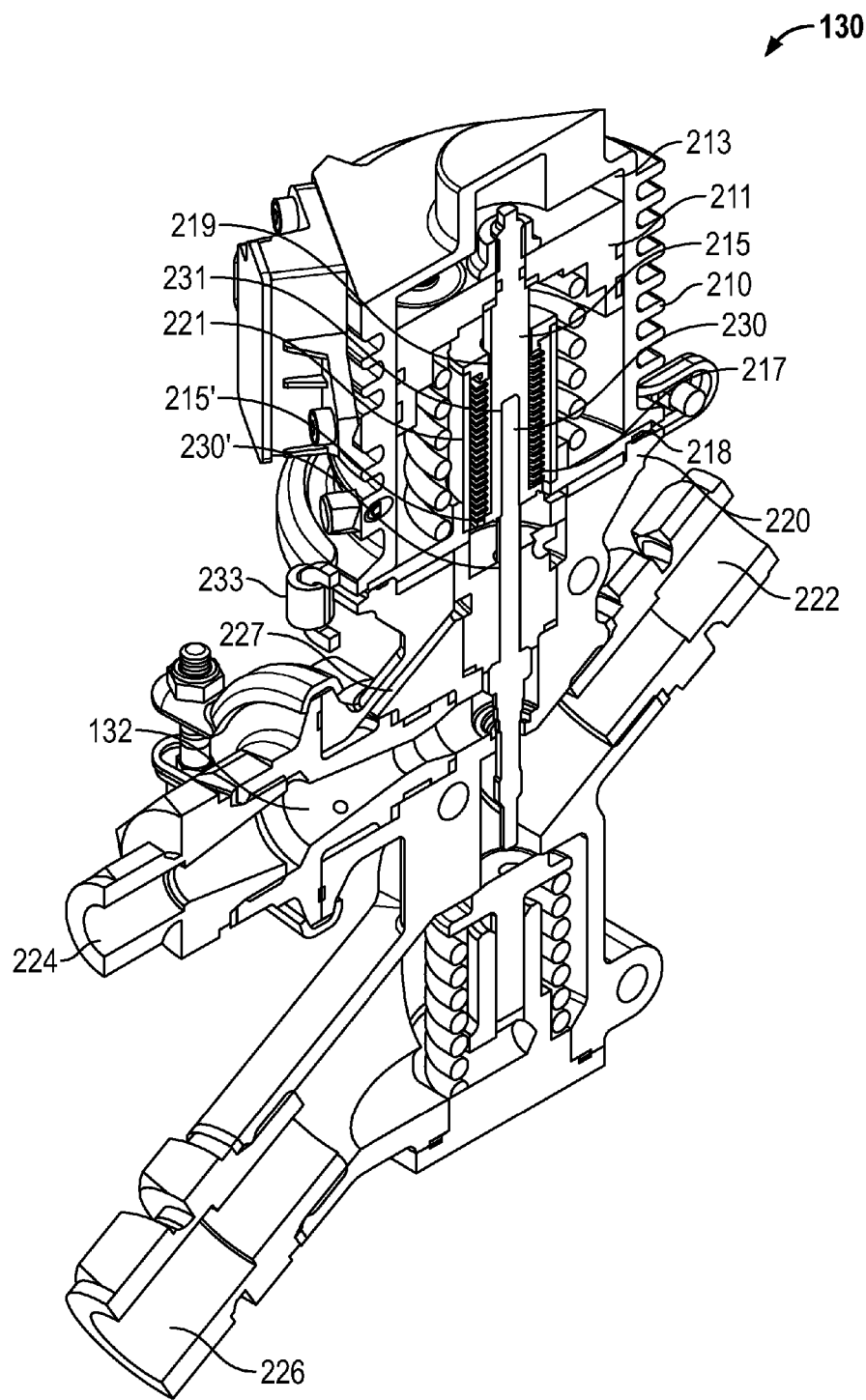
FIG. 7 shows a third embodiment of a bypass valve.

FIG. 7 is a perspective sectional view of another embodiment of a bypass valve 130 according to the invention and including an actuator housing 210 sealingly coupled to a valve housing 220 via gasket 218.

Actuator housing 210 and valve housing 220 are clamped together by a V-section band 233, which may be a simple deformed band. In contrast to bolted or screwed connections, such a clamp offers freedom of orientation between elements, a centralising effect for multiple elements being clamped, consistent clamping range over different temperature ranges of different clamp elements and avoidance of thread galling.

Actuator housing 210 comprises a pneumatic cylinder 213 accommodating a piston 211 attached to one, upper end of a rod 215, the other, lower end of which engages the upper end of valve stem 230 by means of a blind bore 231.

To prevent leakage of any—potentially superheated—fluid at the upper portion of valve stem into the pneumatic cylinder 213, a tubular bellows 217, made from metal e.g. steel, is sealed between the lower end 215' of the rod 215 and the outside of the bore 219 through which the rod 215 passes into the cylinder 213. In the same or alternative embodiments, the metal bellows could be made from other materials. The bellows 217 is arranged such that the pressure of the working fluid acts on the outside of the bellows, which beneficially affects the life of the bellows. As shown, the bore is vertically offset from the lower end of the actuator housing (by means of tubular extension 221), with the result that the bellows also sit within the envelope of the actuator housing.

The arrangement of the valve housing 220 is similar to that of embodiments above, with a valve inlet 222, a bypass outlet 224, and an expander outlet 226 controlled by the valve stem 230.

The valve housing 220 also includes a flow connection 227 that connects the region adjacent the upper portion 230 of the valve stem 230 (and outside of the bellows) to a region of lower pressure downstream of the bypass outlet 224. This reduces the pressure of any working fluid at the upper region of the valve stem on the bellows 217. This eliminates high and variable pressures of working fluid that could limit the life of the bellows and improves control of the valve. As shown, conduit connects downstream of a convergent-divergent venturi 132 in the bypass outlet 224; however, this pressure relieving connection could be connected to alternative low pressure locations in the circuit.

In addition, stem 230 has a specific control stem profile, with seats at both travel limits to limit the build-up of pressure from the working fluid on the bellows 217. The stem has a low leakage bushing and sealing at both ends.

FIG. 8 shows a cross-sectional view of the vapor control module 103 according to an embodiment. According to an embodiment, the vapor control module 103 when in a first position comprises a housing 403, which houses the bypass valve 128. As shown, the bypass valve 128 can include a biasing member 460, which can bias a valve member 461 towards a first position. In the first position, the valve member 461 can open a fluid communication path between the inlet port 127 and the first outlet port 157 and close a fluid communication path between the inlet port 127 and the second outlet port 158. According to an embodiment, between the inlet port 127 and the outlet port 157 is a needle valve 131. The needle valve 131 can be provided to control the flow rate and pressure through the vapor control module 103. According to an embodiment, the needle valve 131 can be adjusted by actuating the adjustor 431. As shown, when the bypass valve 128 is in the first position, fluid can flow from the inlet port 127, through the needle valve 131 to a bypass fluid chamber 462. According to an embodiment, the valve member 461 includes a valve seal 463, which is located within the bypass fluid chamber 462 and is configured to seal against a valve seat 464. However, when the bypass valve 128 is actuated to the first position, the valve seal 463 is moved away from the valve seat 464.

According to an embodiment, downstream from the bypass fluid chamber 462, the superheated fluid flows into the venturi 132. The venturi 132 can further reduce the pressure of the superheated fluid and increase the velocity of the superheated fluid before exiting the second outlet port 157 and flowing to the condenser 150. In some embodiments, the superheated fluid may increase to a sonic velocity, for example. As discussed above, in some embodiments, the vapor control module 103 can further include an injection port 465, which can receive cooling fluid from the fluid supply 104 via the cooling valve 133. When the cooling valve 133 is actuated, the cooling liquid can flow into the vapor control module 103 at the venturi 132 of the bypass circuit 130. As those skilled in the art can appreciate, by increasing the velocity of the superheated fluid to sonic velocity, the cooling liquid is better dispersed and therefore, the cooling efficiency is increased. Therefore, prior to the fluid leaving the outlet port 157, the superheated fluid cooled. This feature helps reduce the thermal shock experienced by the condenser 150.

Additionally or alternatively, a flow control valve 142 may regulate the flow of the fluid from the cooling valve 133 to the injection port 465. The flow control valve 142 may control the flow based on parameters in the waste heat recovery system 100 and/or the engine 101. For example, a temperature gauge 144 may provide a temperature of fluid in the bypass circuit 130. The flow control valve 142 may control the flow of the fluid to the injection port based on the temperature of the fluid in the bypass circuit 130. The flow control valve 142 may also control the flow based on the engine's 101 power output. For example, the flow control valve 142 may increase the flow to the bypass circuit 130 when the engine's 101 power output drops due to the vehicle slowing due to the operator releasing the gas pedal. The cooling fluid may enter the bypass circuit 130 to cool the superheated fluid when the vapor control module 103 diverts the superheated fluid flow from the expander 140 to the bypass circuit 130.

According to an embodiment, the bypass valve 128 can also be actuated to a second position. In the second position, fluid flows from the inlet port 127 to the second outlet port 158 towards the expander 140. In order to actuate the bypass valve 128 to the second position, the pilot supply valve 137 can be actuated from the default, first position, to a second position. Substantially simultaneously, or prior to actuating the pilot supply valve 137, the exhaust valve 138 can also be actuated to a second position to close the exhaust valve 138. As can be appreciated, in alternative embodiments, the pilot supply valve 137 and the exhaust valve 138 can be replaced with a single 3/2-way valve or some other single valve configuration. With the exhaust valve 138 closed and the pilot supply valve 137 actuated, fluid pressure is supplied to the pilot valve actuator 139. As can be seen in FIG. 4, pressurized fluid supplied to the pilot valve actuator 139 acts on a piston member 439. When the pressure acting on the piston member 439 reaches a threshold pressure, the biasing force of the biasing member 460 and the fluid pressure acting on the valve member 461 is overcome to move the valve member 461 towards a second position (down according to the orientation shown). As the valve member 461 moves down, the valve seal 463 seals against the valve seat 464 and a second valve seal 466 unseats from a second valve seat 467.

According to an embodiment, with the valve member 461 in the second position, fluid can flow from the inlet port 127 towards the second outlet port 158 and towards the expander 140. However, with the valve seal 463 sealed against the valve seat 464, fluid is substantially prevented from flowing directly to the condenser 150. Although the valve seal 463 ideally forms a completely fluid-tight seal, even if a small amount of fluid escapes past the valve seal 463, the fluid will simply flow to the condenser 150 and thus, a pressure will not build up in the bypass fluid chamber 462.

As can be appreciated, the vapor control module 103 must be able to withstand the extreme pressures and temperatures of the superheated vapor flowing from the evaporator(s) 120. Therefore, a number of features are included in the vapor control module 103 to accommodate such extreme conditions. According to an embodiment, the sealing performed by the bypass valve 128 can be accomplished with metal-to-metal sealing. Therefore, the valve seals 463 and 466 along with the valve seats 464, 467 can all comprise a metal. Those skilled in the art will readily appreciate suitable metals. Furthermore, because of the poppet nature of the valve seals 463, 466 and valve seats 464, 467, little pressure drop is experienced through the bypass valve 128 when in the second position.

Additionally, the pilot valve actuator 139 is designed to limit the heat transferred to the elastomeric seal 468 and guide ring 469 used for the piston 439. For example, according to an embodiment, the pilot valve actuator 139 can include a plurality of heat fins 470. As is generally known in the art, heat fins can aid in dissipating heat by increasing the surface area of the component. Therefore, the heat fins 470 can remove some of the heat experienced by the contact between the housing 403 and the pilot valve actuator 139. In addition to the heat fins 470, according to an embodiment, the pilot valve actuator 139 can be coupled to the housing 403 using brackets 471. The brackets 471 can create an air gap 472 to further increase the surface area of the pilot valve actuator 139. This minimizes the surface area of contact between the pilot valve actuator 139 and the housing 403. These features can help to thermally decouple the pilot valve actuator 139 from the remainder of the vapor control module 103.

The bypass valve 130 is described in the foregoing as being employed in the exemplary waste heat recovery system 100. However, the bypass valve 130 may be employed in a variety of waste heat recovery systems different from the waste heat recovery system 100 depicted in FIG. 1. For example, the bypass valve 130 may regulate the flow of the heated fluid in another waste heat recovery system that employs additional valves that regulate the flow of fluids to the evaporator 120. That is, the bypass valve 130 may regulate the flow of the fluid in conjunction with other valves. The bypass valve 130 may also be employed in waste heat recovery systems that employ a variety of temperature sensors to control the position of the valve stem 230.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other waste heat recovery systems, and not just to the embodiments described above and shown in the accompanying figures. For example, the teachings provided herein may be applied to waste heat recovery systems that employ cycles other than the Rankine cycle. Alternatively / in addition, elements of the invention may be applied to bypass valves that employ actuation mechanisms rather than pneumatic, e.g. electric. Accordingly, the scope of the embodiments described above should be determined from the following claims.

We claim:

1. A waste heat recovery system (100) for an engine, comprising:
    a fluid supply (104);
    one or more evaporators (120) in fluid communication with the fluid supply (104) and receiving waste heat from the engine (101);
    an expander (140);
    a condenser (150); and
    a bypass valve adapted to selectively provide a fluid communication path between the one or more evaporators and the expander or the one or more evaporators and the condenser, wherein the bypass valve (130) comprises:
        an inlet port (127) in fluid communication with an outlet of the one or more evaporators (120);
        a first outlet port (158) in fluid communication with the expander (140);
        a second outlet port (157) in fluid communication with the condenser (150);
        a first valve member (250) adapted to prevent flow of fluid from the inlet port to the first outlet port;
        a second valve member (230) adapted to regulate the flow of fluid from the inlet port to the second outlet port; and
        an actuator adapted to actuate the first valve member and the second valve member, and wherein the actuator is a fluid-powered actuator and is selectively in fluid communication with the fluid supply (104), via a pilot supply valve (137).

2. The waste heat recovery system of claim 1, wherein the bypass valve (130) comprises:
    a valve housing having;
        an inlet port (127) in fluid communication with an outlet of the one or more evaporators (120);
        a first outlet port (158) in fluid communication with the expander (140); and
        a second outlet port (157) in fluid communication with the condenser (150);
    a poppet (250) coupled to the valve housing (220) and adapted to prevent flow of fluid from the inlet port to the first outlet port; and
    a valve stem (230) with at least a portion disposed in the valve housing (220) and adapted to regulate the flow of fluid from the inlet port to the second outlet port.

3. The waste heat recovery system of claim 2, wherein the valve stem (230) is adapted to:
    displace the poppet (250) to allow the flow of fluid from the inlet port to the first outlet port; and
    regulate the flow of fluid from the inlet port to the second outlet port.

4. A method of regulating a flow of a fluid in a waste heat recovery system (100), comprising:
    moving a valve stem (230) in the valve housing (220) to and from the expander poppet (250) adapted to prevent the flow of the fluid to an expander (140) to regulate the flow of the fluid, further comprising the step of flowing the fluid past a meter profile (232) on the valve stem (230) to regulate the flow of the fluid.

5. The method of claim 4, further comprising the step of allowing the flow of the fluid to the expander (140) by displacing the expander poppet (250) with the valve stem (230).

6. A waste heat recovery system (100) for an engine, comprising:
    a fluid supply (104);
    one or more evaporators (120) in fluid communication with the fluid supply (104) and receiving waste heat from the engine (101);
    an expander (140) in fluid communication with the one or more evaporators;
    a condenser (150); and
    a bypass valve (130) comprising a moveable valve member (230) adapted to provide a fluid communication path between the one or more evaporators and the condenser,
        a moveable pilot piston adapted to move the moveable valve member (230), and
        a static seal (217;720) between the fluid communication path and the moveable pilot piston.

7. The waste heat recovery system of claim 6, wherein the static seal comprises a membrane.

8. The waste heat recovery system of claim 7, wherein the static seal comprises a flexible bellows (217;722).

9. The waste heat recovery system of claim 8, wherein the bypass valve comprises:
    a piston rod attached to the pilot piston and adapted to engage the valve member;
    an actuator housing (210) comprising a cylinder for the pilot piston;
    wherein a first part of the flexible bellows (217) is sealed to the piston rod and a second part of the flexible bellows is sealed to the actuator housing.

10. The waste heat recovery system of claim 9, wherein the flexible bellows is tubular with an internal and an external surface.

11. The waste heat recovery system of claim 10, wherein the external surface is in fluid communication with the fluid communication path.

12. The waste heat recovery system of claim 11, wherein the external surface is in fluid communication with the fluid communication path downstream of the valve member.

13. The waste heat recovery system of claim 12, wherein the fluid communication path downstream of the valve member comprises a convergent-divergent section and wherein the external surface is in fluid communication with the fluid communication path downstream of the convergent-divergent section.

14. The waste heat recovery system of claim 9, wherein the bypass valve comprises a valve housing , the valve housing and valve member together defining the fluid communication path, wherein the valve housing and actuator housing are sealingly engaged at a first location and the second part of the flexible bellows is sealed to the actuator housing at a second location, offset along the axis of movement of the valve stem from the first location.

* * * * *